United States Patent [19]

Weber

[11] Patent Number: 5,114,743
[45] Date of Patent: May 19, 1992

[54] METHOD OF MAKING NITRIDE AND OXIDE ELECTRODES ON A SOLID ELECTROLYTE

[75] Inventor: Neill Weber, Murray, Utah

[73] Assignee: BETA Power, Inc., Salt Lake City, Utah

[21] Appl. No.: 438,067

[22] Filed: Nov. 20, 1989

[51] Int. Cl.⁵ .............................................. B05D 5/12
[52] U.S. Cl. ..................................... 427/77; 427/115; 427/126.1; 427/226; 427/343; 427/379
[58] Field of Search ..................... 427/77, 226, 126.1, 427/343, 379, 115

[56] References Cited

U.S. PATENT DOCUMENTS

| | | | |
|---|---|---|---|
| 4,049,877 | 9/1977 | Saillant et al. | 429/11 |
| 4,348,468 | 7/1982 | Wright | 429/193 |
| 4,466,996 | 8/1984 | Boxall et al. | 427/126.1 |
| 4,528,084 | 7/1985 | Baer et al. | 427/126.5 |
| 4,686,320 | 8/1987 | Novak et al. | 136/239 |
| 4,943,496 | 7/1990 | Okada et al. | 427/115 |

FOREIGN PATENT DOCUMENTS

| | | |
|---|---|---|
| 0227467 | 1/1987 | European Pat. Off. |
| 0228890 | 7/1987 | European Pat. Off. |
| 1023135 | 3/1966 | United Kingdom |
| 2018496 | 10/1979 | United Kingdom |
| 1595061 | 8/1981 | United Kingdom |

OTHER PUBLICATIONS

Abstract, L. Milenysheva (Soviet Union 248088).
Chem. Abstracts, vol. 103, No. 26, Dec. 1985, Toshiba Corp., "Ceramic Sintered Bodies".

*Primary Examiner*—Janyce Bell
*Attorney, Agent, or Firm*—Finnegan, Henderson, Farabow, Garrett & Dunner

[57] ABSTRACT

A method is disclosed for bonding nitride and oxide film electrodes on ceramic substrates, which can be used in thermo electric generators. Hydride powders in suspension are coated on a substrate, and heated to selected temperatures for selected periods of times in alternating atmospheres of hydrogen and nitrogen, or oxygen. The method produces satisfactory film electrodes, including electrodes which are greater than 10 microns in thickness.

30 Claims, 3 Drawing Sheets

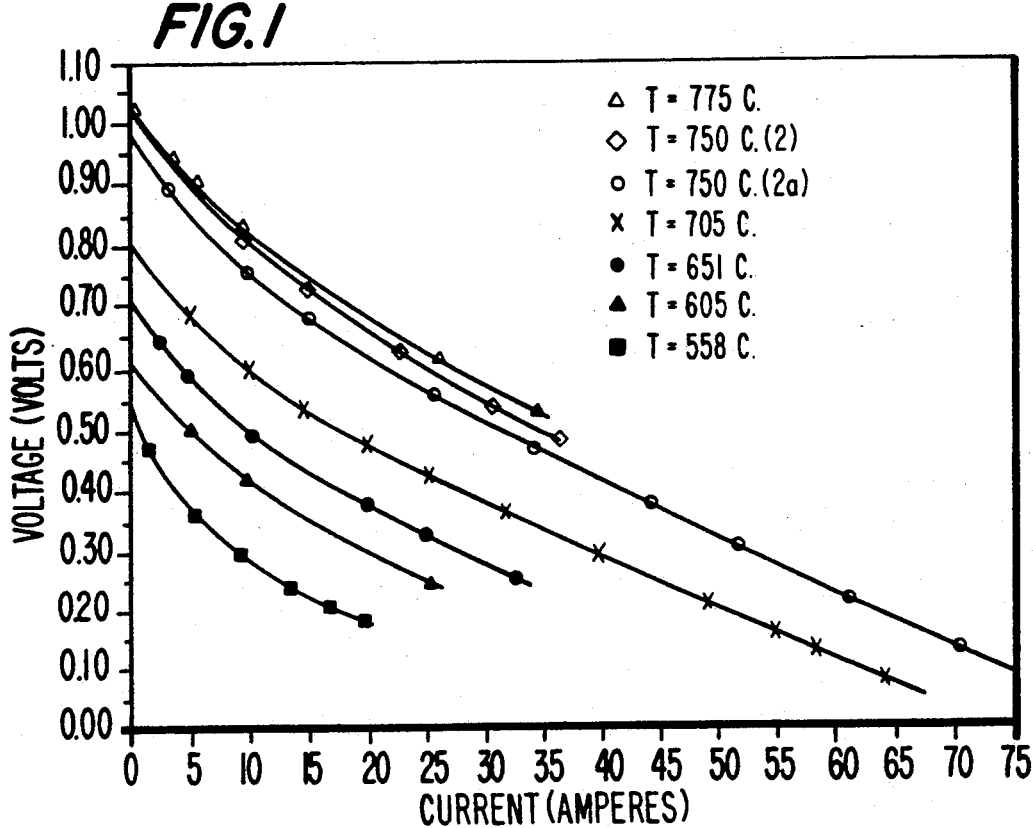
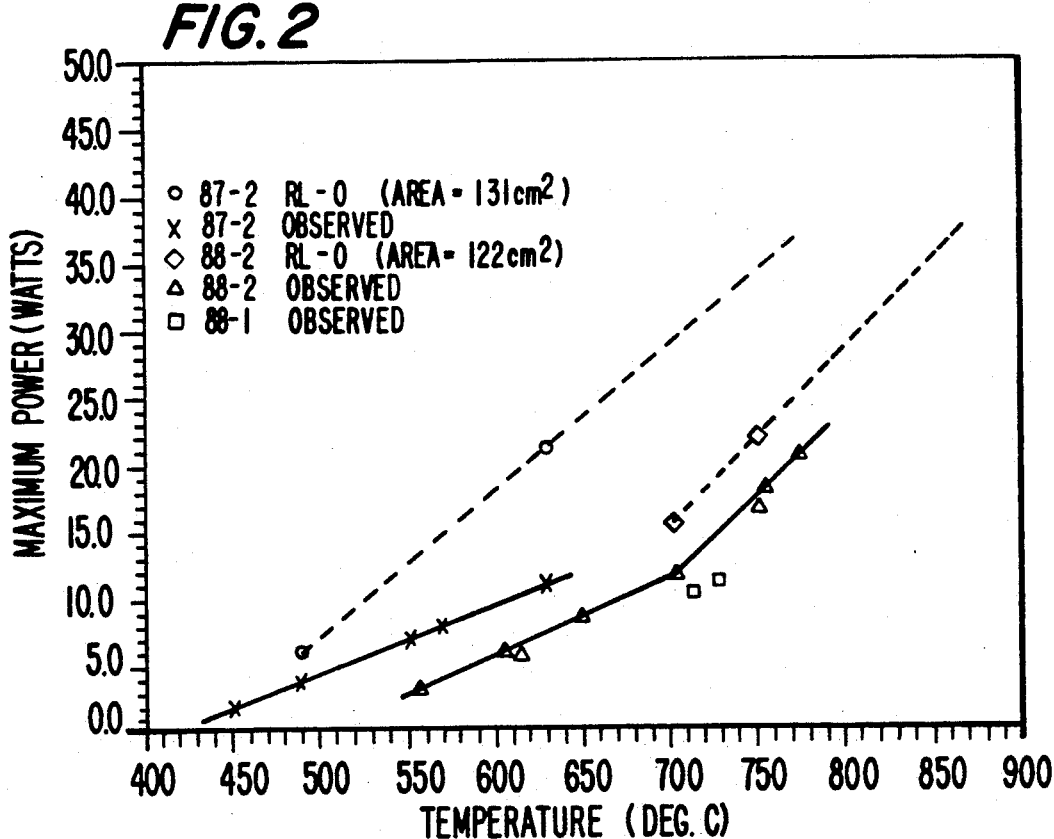

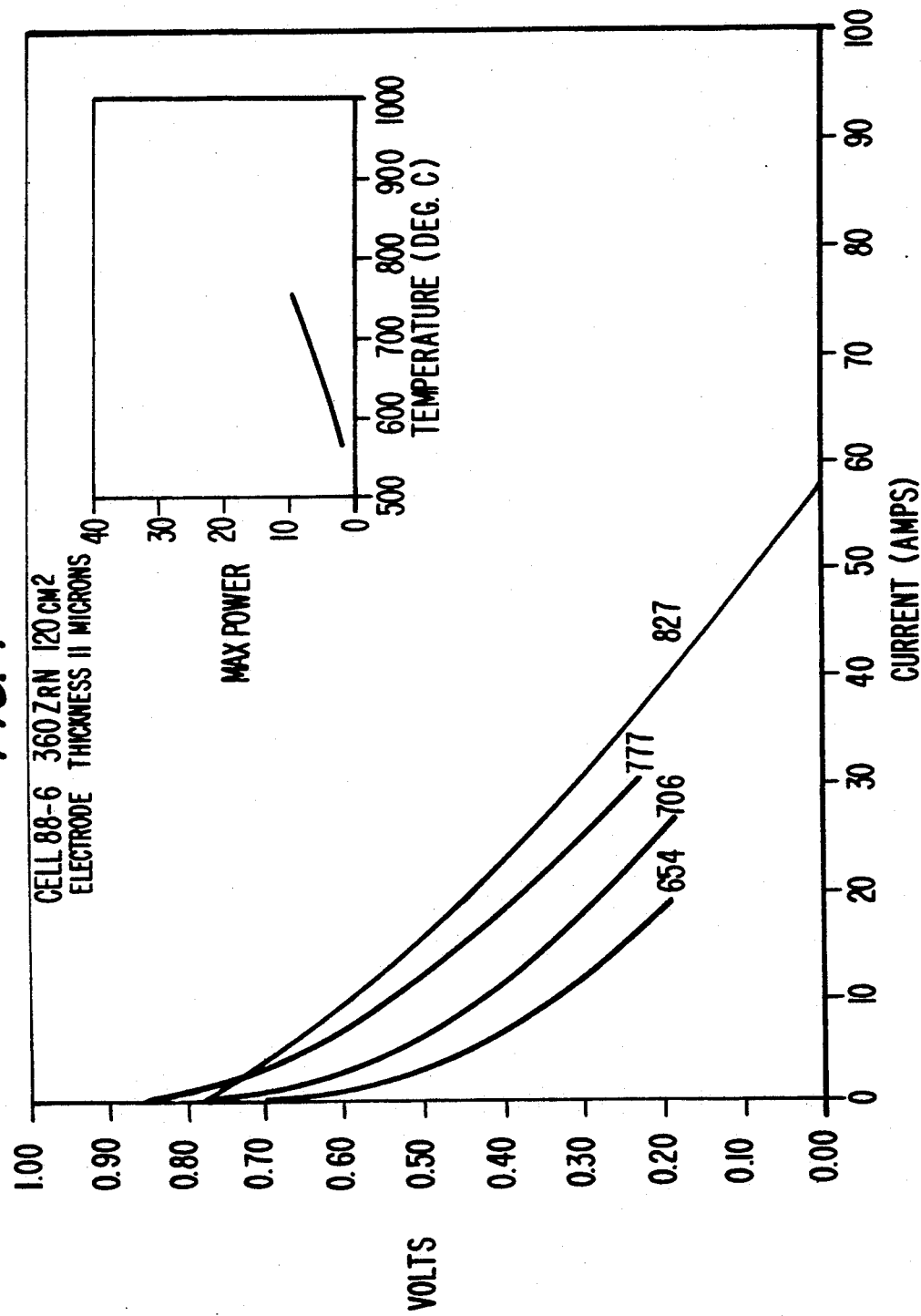

METHOD OF MAKING NITRIDE AND OXIDE ELECTRODES ON A SOLID ELECTROLYTE

This invention was made with Government support as a result of a subcontract from CERAMATEC under Prime Contract No. N00014-87-C-0858 awarded by the Office of Naval Research. The Government has certain rights in this invention.

BACKGROUND OF THE INVENTION

1. Field of the Invention

The invention relates to a method for forming a nitride or oxide film electrode on a solid electrolyte, and more specifically to a method for forming a nitride or oxide film electrode on beta"-alumina for use in a thermo-electric generator.

2. Description of the Related Art

Thermo-electric generators convert heat energy from a heat source to electricity. Examples of thermo-electric generators are the sodium heat engine (SHE), alkali metal thermo-electric converter (AMTEC), or liquid metal thermo electric converter (LMTEC), which generate electricity by expanding a metal, for example sodium, across a solid electrolyte. In such generators, the solid electrolyte separates a closed container into a first and second reaction zone. The first reaction zone contains liquid sodium, while the second reaction zone contains an electrode in contact with the solid electrolyte. As the first reaction zone is heated, the liquid sodium gives up electrons, causing sodium ions to migrate through the electrolyte to the second reaction zone, to be neutralized at the electrode-electrolyte interface. Neutralized sodium metal atoms pass through the electrode, then evaporate, pass through a condenser, and are returned to the first reaction zone.

The efficiency of the electrode in the thermo-electric generator described above has been optimized by use of permeable materials which do not impede migration of the sodium atoms through the electrode, while simultaneously conducting electrons to the solid electrolyte interface to neutralize the sodium ions migrating through the electrolyte. A good example of a suitable electrode displaying the above features is a porous metal film, such as a nitride, deposited on a ceramic electrolyte.

Various methods have been proposed for producing an electrode such as the one described above. Such methods include reactive sputtering, ion plating, electron beam evaporation, and the like. Such methods, however, have a number of drawbacks when used to produce a metal film electrode on a ceramic substrate for use in a thermo-electric generator.

For example, the conventional methods frequently degrade the mechanical or ion-conducting properties of the ceramic substrate.

Further, the conventional methods produce a film which does not adhere well to the ceramic substrate over the life of the electrode.

Further, the conventional methods are relatively expensive and extremely time consuming, producing a serious commercial disadvantage.

Further, the conventional methods produce an extremely dense film on the ceramic substrate. It would be advantageous for the metal film to be as thick as possible, since such an electrode would have a low sheet resistance to electron flow. However, due to the high density of the film produced by the conventional methods, increasing thickness results in high impedance to diffusion of neutralized sodium atoms. Thus, using the conventional methods, only a thin electrode can be produced which has any reasonable commercial use.

The present invention improves on the conventional methods by providing a method for bonding a film electrode on a solid electrolyte that does not degrade the mechanical or ion-conducting properties of the electrolyte, adheres well to the electrolyte, is quick and inexpensive, and produces thicker films, thus improving conductivity without impeding the diffusion of sodium atoms.

Additional advantages of the invention will be set forth in the description which follows and in part will be obvious from the description, or may be learned from practice of the invention. The advantages of the invention may be realized and obtained by means of the instrumentalities and combinations particularly pointed out in the appended claims.

SUMMARY OF THE INVENTION

In accordance with the purposes of the invention as embodied and broadly described herein, there is provided a method for forming a nitride film electrode on a surface of a solid electrolyte substrate comprising the steps of suspending a metallic powder in a liquid having a binder dissolved therein, forming a coating of the liquid suspension on the surface of the electrolyte, the liquid and binder being evaporable without substantial carbonization as it is heated past a first elevated temperature, heating the coating in a hydrogen atmosphere to a selected second elevated temperature higher than the first elevated temperature to convert the coating to a bonded film and increasing the bondability of the film to the electrolyte without the electrolyte losing ion-conducting properties, subjecting the film in the hydrogen atmosphere to the selected second temperature for a first time period to effect the required degree of the bonding of the film to the electrolyte, and subjecting the film at the expiration of the first time period to a nitrogen atmosphere for a second time period effective to convert the bonded film to a nitride film.

There is further broadly provided a method for forming an oxide film electrode on a surface of a solid electrolyte substrate comprising the steps of suspending a metallic powder in a liquid having a binder dissolved therein, forming a coating of the liquid suspension on the surface of the electrolyte, the liquid and binder being evaporable without substantial carbonization at a first elevated temperature, heating the coating in a hydrogen atmosphere to a selected second elevated temperature higher than the first elevated temperature to convert the coating to a bonded film and increasing the bondability of the bonded film to the electrolyte without the electrolyte losing ion conducting properties, subjecting the film in the hydrogen atmosphere to the selected second temperature for a first time period to effect the required degree of bonding of the film to the electrolyte, and subjecting the film at the expiration of the first time period to an oxygen atmosphere for a second time period effective to convert the bonded film to an oxide film.

It is preferable that the metallic powder used in the suspending steps is a metal hydride, and that the metal hydride is selected from a group consisting of titanium hydride ($TiH_2$), zirconium hydride ($ZrH_2$), hafnium hydride ($HfH_2$), and vanadium hydride ($VH$).

It is further preferable that the first elevated temperature is in a range from 100° C. to 400° C.

It is further preferable that the second elevated temperature is in a range from 800° C. to 1100° C., and ideally 900° C.

There is further broadly provided a nitride film electrode for use in a thermo-electric generator, formed by the methods described above, having a low sheet resistance to electron flow and a high permeability for alkali metal atom diffusion, having a thickness of greater than 10 microns.

There is further broadly provided an oxide film electrode for use in a thermo-electric generator, formed by the methods described above, having a low sheet resistance to electron flow and a high permeability for alkali metal atom diffusion, having a thickness of greater than 10 microns.

DESCRIPTION OF THE DRAWINGS

The accompanying drawings which are incorporated in and constitute a part of the specification, illustrate a preferred embodiment of the invention, together with the general description given above and a detailed description of the preferred embodiment given below, serve to explain the principles of the invention.

FIG. 1 is a graph showing voltage-current curves for a thermo-electric generator cell using a titanium nitride electrode formed by the method of the present invention.

FIG. 2 is a graph showing maximum power versus temperature for titanium nitride electrode formed by the methods of the present invention.

FIG. 4 is a graph showing voltage-current curves and maximum power versus temperature for a thermo-electric generator cell using a zirconia nitride electrode having a film thickness of 11 microns.

DESCRIPTION OF THE PREFERRED EMBODIMENTS

Figure 3:
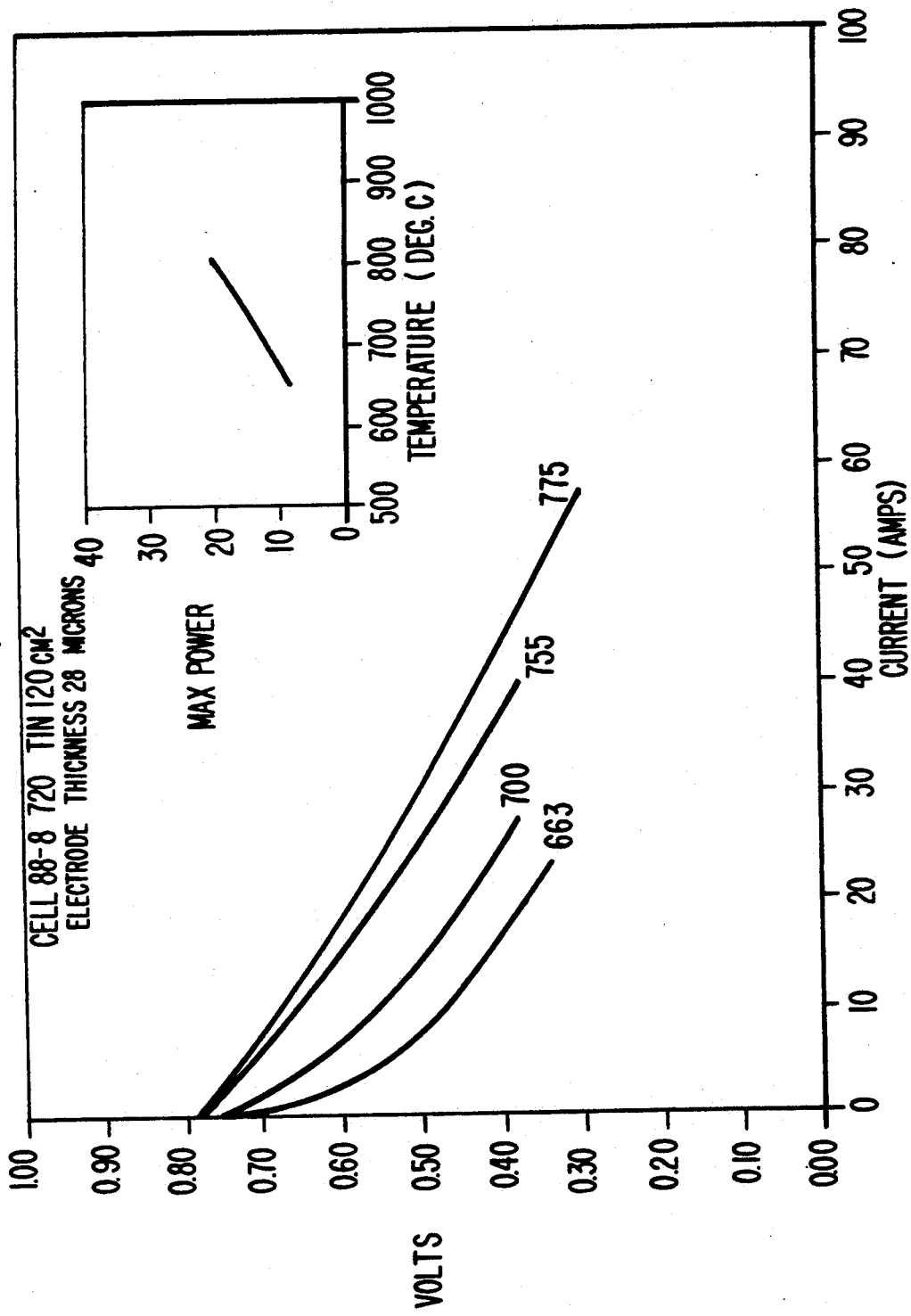
FIG. 3 is a graph showing voltage current curves and maximum power versus temperature for a thermo-electric generator cell using a titanium nitride electrode having a film thickness of 28 microns.

Reference will now be made in detail to the present preferred embodiments of the invention.

A method for forming a nitride film electrode on a surface of a solid electrolyte substrate for use in a thermo electric generator includes a step of suspending a metallic powder in a liquid having a binder dissolved therein. As broadly described herein, the metallic powder used in the suspending step is a metallic hydride and may be selected, for example, from a group consisting of titanium hydride ($TiH_2$), zirconium hydride ($ZrH_2$), hafnium hydride ($HfH_2$), and vanadium hydride ($VH$), all of which are readily available as fine powders and decompose at moderate temperatures. Metal powders may also be used but are generally less preferable because it is difficult to grind metals into suitably fine powders. The metallic hydride is suspended in, for example, toluene and dissolved therein with a small amount of a binder such as a methacrylate. A typical formula may be 10 grams of $TiH_2$ of 1-3 micron grain size, suspended in 250 milliliters of toluene, in which is dissolved 0.5 grams of ELVACITE 2046, (manufactured by DuPont).

In accordance with the invention, a coating of the liquid suspension is formed on a surface of an electrolyte. Preferably, the suspension is sprayed on a surface of the substrate which may be, for example, a ceramic such as beta"-alumina, in order to uniformly deposit a coating of the suspension thereon. Other acceptable techniques include brushing or rolling the suspension onto the substrate, screen printing, dipping the substrate in the suspension, or other methods well-known in the art.

In accordance with the invention, the liquid and binder evaporate without substantial carbonization as the electrolyte and suspension are heated past a first elevated temperature. As broadly described herein, the substrate with the applied coating is placed in a conventional heating chamber, and heated at a constant rate. The binder is removed from suspension and evaporated without carbonization as the coated electrolyte is heated past a first temperature, being in a range from 100° C. to 400° C.

In accordance with the invention, the coated electrolyte is heated in a hydrogen atmosphere to a selected second elevated temperature higher than the first elevated temperature to convert the coating to a bonded film, increasing the bondability of the film to the electrolyte without the electrolyte losing ion conducting properties. The film is subjected to the second temperature for a first time period to effect the required degree of bonding. As broadly described herein, a hydrogen atmosphere is introduced into the chamber, preferably by a step of flowing a stream of dry hydrogen over the coated electrolyte, promoting a decomposition of the metal hydride and promoting bonding of the metal to the ceramic substrate. This bonding step in the hydrogen atmosphere is conducted at a selected second temperature for a first time period. The ideal second temperature has been found to be in a range of 800° C. to 1100° C., and ideally 900° C., with this temperature maintained for at least 30 minutes.

In accordance with the invention, at the expiration of the first time period the film is subjected to a nitrogen atmosphere for a second time period effective to convert the bonded film to a nitride film. As embodied herein, the flow of gas over the metal film is switched from hydrogen to nitrogen or a mixture of nitrogen and hydrogen. Preferably, nitrogen is flowed over the film for at least 30 minutes in order to complete the nitriding.

To obtain pure nitride electrodes, a step of excluding oxygen impurities, which tend to displace the nitrogen to create oxides in the film, may be included in the process. The step of excluding oxygen impurities may include, for example, using pure nitrogen rather than conventional tank nitrogen, or purging the nitrogen lines with hydrogen or inert gas prior to flowing nitrogen. Another method is introducing a getter or a purifier apparatus, comprising a screen coated with the hydride suspension, in the nitrogen lines upstream of the chamber. Oxygen impurities in the nitrogen are scavenged by reacting with the suspension on the purifier apparatus, leaving pure nitrogen to flow to the heating chamber.

To obtain pure nitride electrodes, another additional step may be performed of cooling the nitride film slowly in dry hydrogen. This step is preferable if impure tank nitrogen has been used in the step of flowing nitrogen and no purification has been performed.

In accordance with the present invention, the method described above may be also be used to form an oxide film electrode on a surface of a solid electrolyte substrate for use in a thermo-electric generator, comprising the steps of suspending a metallic powder in a liquid having a binder dissolved therein, forming a coating of the liquid suspension on the surface of the electrolyte the liquid and binder being evaporable without substantial carbonization at a first elevated temperature, heating the coating in a hydrogen atmosphere to a selected second elevated temperature higher than the first elevated temperature to convert the coating to a bonded film and increasing the bondability of the bonded film to the electrolyte without the electrolyte losing ion-conducting properties, subjecting the film in the hydrogen atmosphere to the selected second temperature for a first time period to effect the required degree of bonding of the film in the electrolyte, and subjecting the film at the expiration of the first time period to an oxygen atmosphere for a second time period effective to convert the bonded film to an oxide film.

As embodied herein, the method for forming the oxide film electrode is similar to that for forming a nitride electrode, with the exception that an atmosphere of oxygen, or nitrogen with oxygen impurities, is flowed over the metal film in place of impurity-free nitrogen. The oxides formed may be, for example, $TiO$, $TiO_2$, $Ti_4O_7$, or others, dependent on the metal selected and the partial pressure of oxygen used. The temperature and times required for the bonding steps are the same as those disclosed for nitride films and therefore shall not be repeated.

The methods described above have been found to produce films which adhere well to the ceramic electrolyte. Of particular importance in producing this adherent bond is the step of heating the film while flowing hydrogen to preferably 900° C. for least 30 minutes prior to flowing nitrogen.

Films formed using the disclosed methods have an advantage in that they are less dense than those deposited using conventional sputtering and vacuum deposition methods. Thus, as broadly described herein, nitride and oxide film electrodes can be formed having a wide range of thicknesses, including a thickness of greater than 10 microns, allowing for improved flow of electrons, while providing adequate diffusion of alkali metal atoms when used in the conventional thermal-electric generator. Nitride and oxide film electrodes of up to 28 microns have been tested with satisfactory results.

Electrodes formed by the methods of the present invention have produced the following experimental results.

A titanium nitride coating approximately 6 to 10 microns thick was applied to a beta"-alumina tube. A current collector was applied to the coated tube as follows. A 3 millimeter pitch helical wrap of 0.25 millimeter molybdenum wire was placed on the coated tube, and overlayed with 4 uniformly spaced 3 millimeter flat braided copper conductors parallel to the tube axis. A second wrap of the molybdenum wire kept the copper cinched down on the first winding. The tube was placed in a sodium heat engine (SHE) cell. The cell was filled from a pressurized tank of purified sodium at 120° C. Cell temperature was raised abruptly to 550° C. Voltage-current traces at temperatures up to 775° C. are shown in FIG. 1. Maximum output power, both the observed and that corrected to zero internal lead resistance, are shown in FIG. 2. One of the cells tested accumulated 2900 ampere hours at 700° C. with no performance loss. Another cell accumulated 9500 ampere hours at temperatures between 700° C. and 750° C. with no performance loss.

In a second experiment, a beta"-alumina tube having a 25.5 mm outer diameter, and a 23.2 mm inner diameter was uniformly coated along a length of 16.5 cm on its exterior with titanium nitride, having total mass of 0.72 grams. If the coating were 100% dense, this would correspond to a thickness of 10 microns. Microscopic measurements showed the actual thickness to be 28 microns and therefore, the coating was 64% porous. The coated tube was provided with a current collector as described above and tested in a SHE cell. The voltage-current curves as well as maximum power versus temperature, obtained by loading the cell at various temperatures are shown in FIG. 3.

In a third experiment, a beta"-alumina tube having a 25.5 mm outer diameter, and a 23.2 mm inner diameter was uniformly coated on its exterior with zirconium nitride along a length of 15.7 cm to produce an electrode 11 microns thick. This tube was provided with a current collector and operated in a SHE cell that, when loaded, produced the voltage-current curves and maximum power versus temperature curves shown in FIG. 4.

Additional advantages and modifications will readily occur to those skilled in the art. The invention in its broader terms is, therefore, not limited to the specific details, representative steps, and examples shown and described. Accordingly, departures may be made from such details without departing from the spirit or scope of the applicant's general inventive concept.

What is claimed is:

1. A method for forming a nitride film electrode on a surface of a solid electrolyte substrate, comprising the steps of:

suspending a metallic powder in a liquid having a binder dissolved therein;

forming a coating of the liquid suspension on the surface of the electrolyte, the liquid and binder being evaporable without substantial carbonization as it is heated past a first elevated temperature;

heating the coating in a hydrogen atmosphere to a selected second elevated temperature in a range from 800° C. to 1100° C. and higher than the first elevated temperature for converting the coating to a bonded film and for increasing bondability of the film to the electrolyte without the electrolyte losing ion conducting properties;

subjecting the film in the hydrogen atmosphere to the selected second elevated temperature for a first time period to effect a required degree of bonding of the film to the electrolyte; and subjecting the film at the expiration of the first time period to a nitrogen atmosphere for a second time period effective to convert the bonded film to a nitride film.

2. The method of claim 1, further comprising the step of cooling the nitride film in an atmosphere of dry hydrogen.

3. The method of claim 1, wherein the metallic powder used in the suspending step is a metal hydride.

4. The method of claim 3, wherein the metal hydride used in the suspending step is selected from a group consisting of $TiH_2$, $ZrH_2$, $HfH_2$, and $VH$.

5. The method of claim 1, wherein the liquid used in the suspending step is toluene.

6. The method of claim 1, wherein the binder used in the suspending step is a methacrylate.

7. The method of claim 1, wherein the first elevated temperature is in a range from 100° C. to 400° C.

8. The method of claim 1, wherein the metallic powder used in the suspending step is a metal compound.

9. The method of claim 1, wherein the second elevated temperature is 900° C.

10. The method of claim 1, wherein the step of heating the coating in a hydrogen atmosphere includes a step of flowing a stream of dry hydrogen over the coating.

11. The method of claim 1, wherein the bonded film formed during the step of heating the coating in a hydrogen atmosphere is a metal film formed by decomposition of the coating in the hydrogen atmosphere.

12. The method of claim 1, wherein the step of subjecting the film to a nitrogen atmosphere includes flowing a stream of nitrogen over the film.

13. The method of claim 1, wherein the step of subjecting the film to a nitrogen atmosphere includes excluding oxygen impurities.

14. The method of claim 1, wherein the first time period is at least thirty minutes.

15. The method of claim 1, wherein the second time period is at least thirty minutes.

16. The method of claim 1, wherein the solid electrolyte substrate is beta"-alumina.

17. A method for forming a nitride film on a surface of a solid electrolyte substrate, comprising the steps of:

suspending a metal hydride in a liquid having a binder dissolved therein;

forming a hydride coating of the liquid suspension on the surface of the electrolyte, the liquid and binder being evaporable without substantial carbonization as it is heated past a first elevated temperature;

heating the hydride coating in a hydrogen atmosphere to a selected second elevated temperature in the range from 800° C. to 1100° C. and higher than the first elevated temperature, for converting the hydride coating to a bonded film and for increasing bondability of the bonded film to the electrolyte without the electrolyte losing ion conducting properties;

subjecting the film in the hydrogen atmosphere to the selected second elevated temperature for a first time period to effect a required degree of bonding of the film to the electrolyte; and subjecting the film at the expiration of the first time period to a nitrogen atmosphere for a second time period effective to convert the bonded film to a nitride film.

18. The method of claim 17, further comprising cooling the nitride film in an atmosphere of dry hydrogen.

19. The method of claim 17, wherein the metal hydride used in the suspending step is selected from a group consisting of $TiH_2$, $ZrH_2$, and $HfH_2$, and $VH$.

20. The method of claim 17, wherein the liquid used in the suspending step is toluene.

21. The method of claim 17, wherein the binder used in the suspending step is a methacrylate.

22. The method of claim 17, wherein the first elevated temperature is in a range from 100° C. to 400° C.

23. The method of claim 17, wherein the second elevated temperature is 900° C.

24. The method of claim 17, wherein the step of heating the coating in a hydrogen atmosphere includes a step of flowing a stream of dry hydrogen over the coating.

25. The method of claim 17, wherein the bonded film formed during the step of heating the hydride coating in a hydrogen atmosphere is a metal film formed by a decomposition of the hydride coating in the hydrogen atmosphere.

26. The method of claim 17, wherein the step of subjecting the film to a nitrogen atmosphere includes flowing a stream of nitrogen over the film.

27. The method of claim 17, wherein the step of subjecting the film to a nitrogen atmosphere includes excluding oxygen impurities.

28. The method of claim 17, wherein the first time period is at least thirty minutes.

29. The method of claim 17, wherein the second time period is at least thirty minutes.

30. The method of claim 17, wherein the solid electrolyte substrate is beta"-alumina.

* * * * *